(12) United States Patent
Norby et al.

(10) Patent No.: US 11,127,022 B2
(45) Date of Patent: Sep. 21, 2021

(54) RETAIL AS A SERVICE

(71) Applicant: b8ta, Inc., San Francisco, CA (US)

(72) Inventors: Vibhu Norby, Mountain View, CA (US); William Mintun, Aptos, CA (US); Phillip Raub, San Francisco, CA (US); Anton Vishnyak, San Ramon, CA (US)

(73) Assignee: B8TA, INC., San Francisco, CA (US)

( * ) Notice: Subject to any disclaimer, the term of this patent is extended or adjusted under 35 U.S.C. 154(b) by 0 days.

(21) Appl. No.: 16/880,924

(22) Filed: May 21, 2020

(65) Prior Publication Data

US 2020/0372521 A1    Nov. 26, 2020

Related U.S. Application Data

(60) Provisional application No. 62/851,091, filed on May 21, 2019.

(51) Int. Cl.
| | | |
|---|---|---|
| G06Q 30/00 | (2012.01) | |
| G06Q 30/02 | (2012.01) | |
| G06Q 10/08 | (2012.01) | |
| G06Q 30/06 | (2012.01) | |
| G06Q 20/20 | (2012.01) | |
| G06F 16/23 | (2019.01) | |
| G06K 7/10 | (2006.01) | |
| G06F 3/14 | (2006.01) | |
| H04L 29/08 | (2006.01) | |

(52) U.S. Cl.
CPC .......... *G06Q 30/0201* (2013.01); *G06F 3/14* (2013.01); *G06F 16/2379* (2019.01); *G06K 7/10366* (2013.01); *G06Q 10/087* (2013.01); *G06Q 20/201* (2013.01); *G06Q 20/203* (2013.01); *G06Q 30/0185* (2013.01); *G06Q 30/0202* (2013.01); *G06Q 30/0276* (2013.01); *G06Q 30/0643* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,904,333 B1* | 3/2011 | Perkowski | ............. | G06Q 30/02 705/14.4 |
| 8,650,072 B2 | 2/2014 | Mason | | |
| 2001/0044751 A1* | 11/2001 | Pugliese, III | ...... | G06Q 30/0643 705/14.1 |
| 2002/0194081 A1* | 12/2002 | Perkowski | ......... | G06Q 30/0601 705/26.1 |
| 2003/0009392 A1* | 1/2003 | Perkowski | ......... | G06Q 30/0641 705/14.51 |

(Continued)

OTHER PUBLICATIONS

Lewis, Tasha. "Technology Enabled Apparel Retail Employees." (2009). (Year: 2009).*

(Continued)

*Primary Examiner* — Gurkanwaljit Singh
(74) *Attorney, Agent, or Firm* — Ahmann Kloke LLP (57) ABSTRACT

A Retail as a Service (RaaS) platform enabling a customer of the RaaS platform to make a product available for retail utilizing the resources and expertise of the RaaS platform, and to monitor the effectiveness of retail efforts with data analytics provided by the RaaS platform. The RaaS platform enables intelligent updating of RaaS parameters in real time, and may include one or more of trained staff, product demo procedures, product placement, onboarding technology, product display technology, and a variety of retail facility sensors.

19 Claims, 7 Drawing Sheets

(56) References Cited

U.S. PATENT DOCUMENTS

| | | | | |
|---|---|---|---|---|
| 2004/0210479 | A1* | 10/2004 | Perkowski | G06Q 30/0237 705/14.51 |
| 2005/0004838 | A1* | 1/2005 | Perkowski | G07F 17/16 705/14.73 |
| 2006/0095331 | A1* | 5/2006 | O'Malley | G06F 16/9574 705/22 |
| 2010/0138037 | A1* | 6/2010 | Adelberg | G06Q 10/087 700/241 |
| 2012/0078700 | A1* | 3/2012 | Pugliese, III | G06Q 30/0224 705/14.25 |
| 2013/0290106 | A1* | 10/2013 | Bradley | G06Q 90/20 705/14.64 |
| 2014/0095285 | A1* | 4/2014 | Wadell | G06Q 30/00 705/14.25 |
| 2014/0195321 | A1* | 7/2014 | Hubbard | G06Q 30/0225 705/14.26 |
| 2015/0356610 | A1 | 12/2015 | Ponoth | |
| 2018/0137521 | A1 | 5/2018 | Norby | |
| 2018/0211718 | A1* | 7/2018 | Heath | A01K 29/005 |

OTHER PUBLICATIONS

Almeida, F. L. F. d. (2009). Creation of value with open source software in the telecommunications field (Order No. 10593180). Available from ProQuest Dissertations and Theses Professional (Year: 2009).*

Sigala, M. (2002). Assessing the impact of information and communication technologies (ICT) on productivity in the hotel sector: An operations management approach (Order No. 10131276). Available from ProQuest Dissertations and Theses Professional (Year: 2002).*

Mokshmar, P. (2012). Effect of sales promotion on retail outlet preference: A customer analysis (Order No. 27535521). Available from ProQuest Dissertations and Theses Professional (Year: 2012).*

Patel, A. V. (2005). Measuring customers' expectations and experiences for online buying versus conventional buying (A comparative study of selected customers' from selected cities of gujarat) (Order No. 10097083). Available from ProQuest Dissertations and Theses Professional (Year: 2005).*

Khan, I., & Rahman, Z. (2016). Retail brand experience: Scale development and validation. The Journal of Product and Brand Management, 25(5), 435-451 (Year: 2016).*

Goswami, S. (2015). A study on the online branding strategies of indian fashion retail stores. IUP Journal of Brand Management, 12 (1), 45-59 (Year: 2015).*

Puccinelli, N. M., Goodstein, R. C., Grewal, D., Price, R., Raghubir, P., & Stewart, D. (2009). Customer experience management in retailing: Understanding the buying process. Journal of Retailing, 85(1), 15-30 (Year: 2009).*

International Application No. PCT/US2020/034106, Search Report and Written Opinion dated Aug. 3, 2020.

* cited by examiner

RETAIL AS A SERVICE

CROSS-REFERENCE TO RELATED APPLICATIONS

The present application claims priority to U.S. Patent Application Ser. No. 62/851,091 filed May 21, 2019, which is incorporated by reference herein.

SUMMARY

Disclosed is a Retail as a Service (RaaS) system that enables a customer to establish a link to a retailer for the purpose of offering products for sale at a facility, and to obtain analytics related to the product. For purposes of explanation, numerous specific details are set forth in this paper. It will be apparent to one skilled in the art that techniques described in this paper can be practiced without these specific details. In some instances, modules, structures, processes, features, and devices are shown in block diagram form. In other instances, functional block diagrams and flow diagrams are shown to represent data and logic flows. When applicable, the components of block diagrams and flow diagrams (e.g., modules, blocks, structures, devices, features, etc.) can be variously combined, separated, removed, reordered, arranged serially or in parallel, and replaced in a manner other than as expressly described and depicted herein.

DETAILED DESCRIPTION

Figure 1:
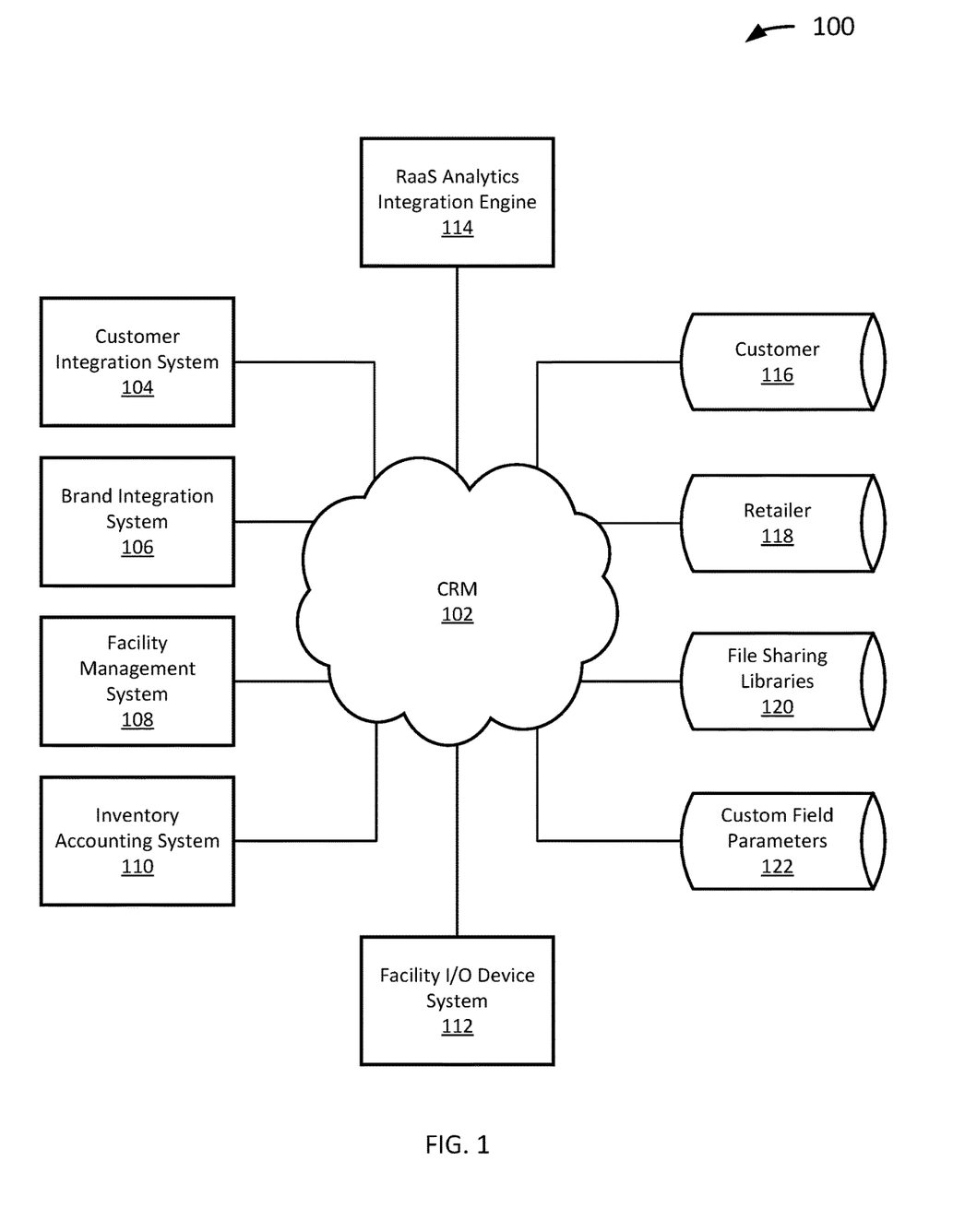
FIG. 1 depicts a diagram of an example of a Retail as a Service (RaaS) system.

FIG. 1 depicts a diagram 100 of an example of a Retail as a Service (RaaS) system. The RaaS system is intended to represent a system that enables a customer of the RaaS system to make a product available for retail utilizing the resources and expertise of the RaaS system to accomplish this goal and monitor the effectiveness of retail efforts with data analytics provided by the RaaS system. The RaaS system may include one or more of trained staff, product demo procedures, product placement, onboarding technology, product display technology, and a variety of retail facility sensors. In some instances, customers with limited resources find RaaS appealing to get product into stores via consignment (potentially with a monthly fee for the RaaS provider). Techniques described in this paper can be incorporated into a white label RaaS system, a "full service" RaaS system, or a partial RaaS system.

The diagram 100 includes a computer-readable medium (CRM) 102, a customer integration system 104 coupled to the CRM 102, a brand integration system 106 coupled to the CRM 102, a facility management system 108 coupled to the CRM 102, an inventory accounting system 110 coupled to the CRM 102, a facility I/O device system 112 coupled to the CRM 102, an RaaS analytics integration engine 114 coupled to the CRM 102, a customer datastore 116 coupled to the CRM 102, a retailer datastore 118 coupled to the CRM 102, file sharing libraries datastore 120 coupled to the CRM 102, and a custom field parameters datastore 122 coupled to the CRM 102.

The CRM 102 may comprise a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality can be distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Returning to FIG. 1, the customer integration system 104 is intended to represent engines and datastores that enable a product producer to establish a business relationship with a retailer. The system may or may not include a lead generation engine, but once contact has been established, the system will convert a lead into a customer by obtaining relevant information, establishing contractual terms, and onboarding the customer. As used in this paper, a customer is intended to mean an entity with one or more products that has been onboarded into an RaaS system; prior to onboarding, the entity can be referred to as a lead or a potential customer. As used in this paper, a retailer is intended to mean the owner of a space where the products of a customer can be displayed. Customers and retailers can include a number of human and artificial agents and, in some instances, can be a combination of distinct entities (e.g., a mall landlord could control some aspects of an RaaS system, while a store owner within the mall could control other aspects of the RaaS system).

The brand integration system 106 is intended to represent engines and datastores that facilitate operational onboarding of a brand. While the terms product and brand can sometimes be used interchangeably in certain contexts, a brand is intellectual property and, accordingly, does not physically exist. Every product has an associated brand even if that brand is not registered or even acknowledged.

The facility management system 108 is intended to represent engines and datastores associated with operation of a facility. In a specific implementation, a facility includes a physical facility. A "physical facility," as used herein, may refer to any area that can be configured to support retail activity. "Retail activity," as used herein, may refer to the transfer of items in a "brick-and-mortar" location for consideration. Retail activity may include sale of items, barter of items, or transfer of items to customers that results in remuneration. A facility can include a dedicated retail space, such as a store in a mall, shopping district, etc. A retailer can have multiple facilities. In various implementations, the facility includes a building, a courtyard, an event center, an airport or travel facility, or some combination thereof. The facility can also include a portion of a building, a courtyard, an event center, an airport or travel facility, etc. In some implementations, the facility is dedicated to a single retailer. In various implementations, the facility may be shared by a plurality of retailers. A facility operator can be an entity that is distinct from entities that control other aspects of an RaaS system. For example, the facility operator can white label an RaaS system that is controlled in substantial part by a distinct RaaS provider.

In a specific implementation, a facility includes fixtures, staff, products for sale in the facility, facility monitoring devices, facility operations devices, and in-facility display devices (including display devices for products that are displayed in-store, but are purchasable through another channel, such as the Internet). Fixtures may include plumbing fixtures, electrical fixtures, kitchen fixtures, light fixtures, and/or other fixtures. Staff may include one or more persons who work at the facility, such as employees, contractors, or other individuals at the facility. Products may include retail items, such as clothing, books, toys, sporting goods, food, consumer electronics, etc. The products may be configured, positioned, or otherwise managed according to instructions from a customer, facility operator, store owner, or RaaS agent. The facility monitoring devices, facility operations devices, and in-facility display devices are described in more detail later in this paper.

The inventory accounting system 110 is intended to represent engines and datastores associated with tracking inventory in an RaaS context. In a specific implementation, the inventory accounting system 110 only begins tracking a product when it is consigned (or in the process of being consigned) to a retailer. However, inventory tracking can initiate at a manufacturer by giving a product a unique identifier and can continue post-sale (though a purchased product is not normally referred to as inventory). Unique, in this context, need not be globally unique; it must simply be possible to track the product within the organization and, when referenced by another organization, to provide a translation to a second unique identifier. These types of unique identifiers can be referred to as organizationally unique identifiers. For the purposes of inventory accounting, substantially identical products can share a unique identifier, making the products interchangeable from an accounting perspective.

The facility I/O device system 112 is intended to represent engines (including at least one sensor) and datastores used to track consumers and products for the purpose of inventory and analytics and to provide an appropriate display for a product.

The RaaS analytics integration engine 114 is intended to represent engines and datastores for taking data from various systems of an RaaS platform, sharing with other systems of the RaaS platform in real time, and performing analytics on behalf of at least a customer and retailer. Advantageously, analytics can be provided on a per-product, per-display, per-facility, per-variation (e.g., by color), to name a few bases. With respect to a per-display basis, it is also possible to predict performance based upon path and heat maps for a potential display location (potentially even if the display location does not exist until facility layout is changed). Analytics can also be provided for a product against a category (e.g., a smart watch compared to other smart watch brands).

The customer datastore 116 is intended to represent data available to a customer. Some data about a customer that is not accessible to the customer may be stored elsewhere, such as in the retailer datastore 118 or in an RaaS provider datastore.

The retailer datastore 118 is intended to represent data available to a retailer. Some data about a retailer that is not accessible to the retailer may be stored elsewhere, such as in an RaaS provider datastore.

The file sharing libraries datastore 120 provides a single location for all data, which can be distributed to various parties in accordance with permissions. Advantageously, a customer can access all relevant data associated with a brand, including demographic, geographic, psychographic, and behavioristic parameters for traffic within a facility. Moreover, the data can be augmented with comparable products at a variety of facilities to provide the customer with superior insight into brand performance and how to improve brand performance. File sharing can also improve customer onboarding (e.g., by maintaining custom files for retailers or facilities that are immediately available), brand onboarding (e.g., by maintaining a shared catalog), facility management (e.g., by making facility layout available in real time), and inventory accounting without intervening entities or because multiple different systems must be accessed to obtain desired data.

The custom field parameters datastore 122 is intended to represent a collection of fields that can be added to a customer or retailer dashboard. In this way, e.g., a retailer dashboard can be customized to fit a retailer-specific business process.

Figure 2:
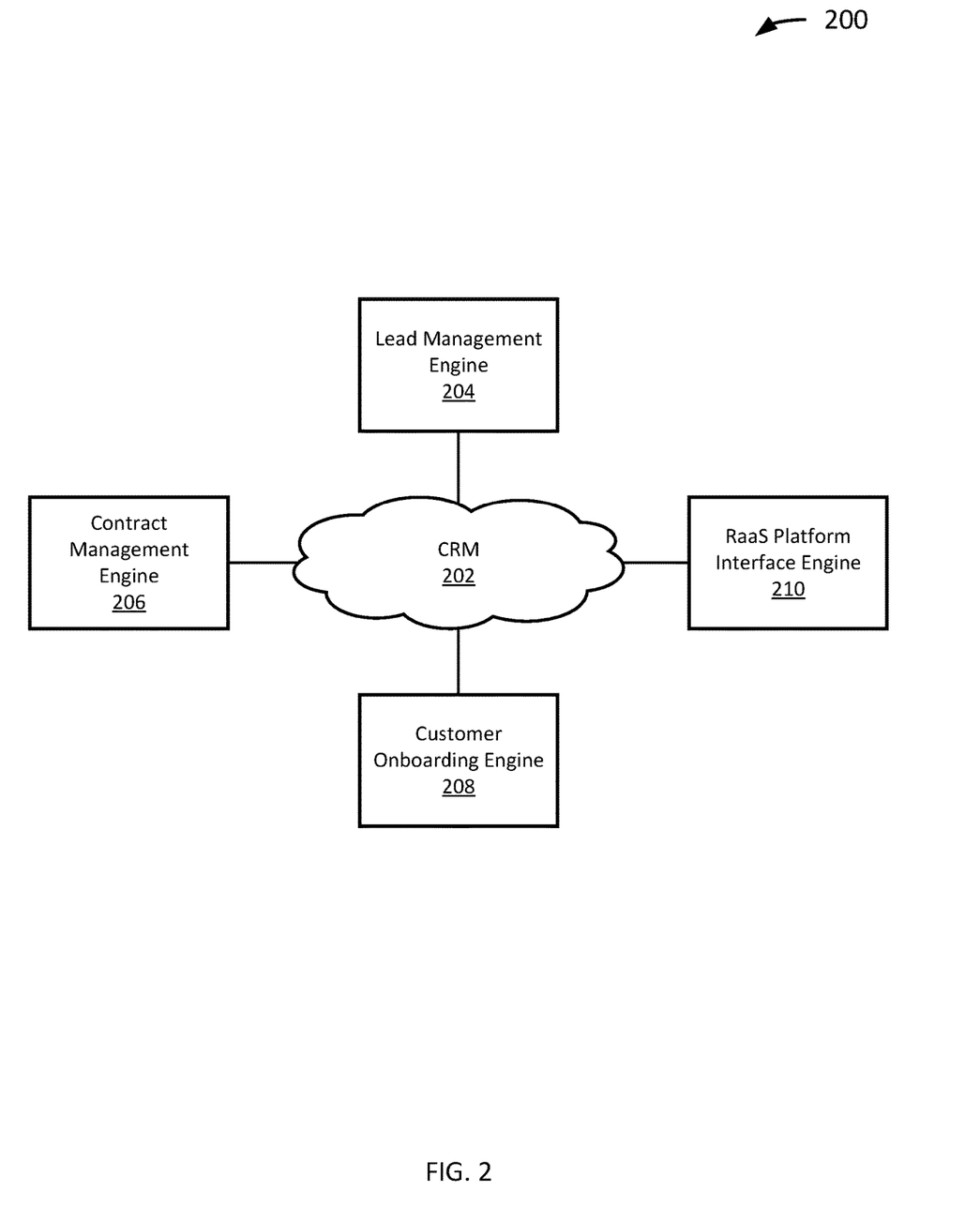
FIG. 2 depicts a diagram of an example of a customer integration system.

FIG. 2 depicts a diagram 200 of an example of a customer integration system. The diagram 200 includes a CRM 202, a lead management engine 204 coupled to the CRM 202, a contract management engine 206 coupled to the CRM 202, a customer onboarding engine 208 coupled to the CRM 202, and an RaaS platform interface 210 coupled to the CRM 202.

The lead management engine 204 is intended to represent an engine that facilitates access by a potential customer to one or more retailers. In a specific implementation, a human or artificial agent of a retailer creates an RaaS onboarding request form with fields that can be filled in by a human or artificial agent of a potential customer. There may or may not be additional preliminary exchanges prior to the potential customer submitting an RaaS onboarding request for a specific retailer. The RaaS onboarding request form can be implemented as a web page with fields such as contact information (e.g., company name, contact person name, email, phone, etc.), brand URL, category of business, description of brand, retail locations (which will vary depending upon the retailer), dates (e.g., which months the product will be featured), estimated budget, whether the brand has associated GS1 certified UPCs, how the company heard about the retailer's program, whether the company is minority-or-women owned, and other data that is deemed valuable to the retailer. In an implementation in which there are multiple retailers, each retailer may have a separate form or one or more groups of retailers may use the same form, which can be made accessible to one or more of the group depending upon whether predetermined conditions, such as an agent of the potential customer specifically selecting a retailer from the group, are met. Advantageously, using analytics described in this paper, predictions can be made about how a product would fare in a monitored facility, which may prompt a retailer to seek out certain customers (or to embark on a lead generation effort to bring certain customers to the platform) or to make specific requests or provide specific recommendations to potential or existing customers.

In a specific implementation, upon receipt of an RaaS onboarding request form an agent of the retailer can decide to reject, request additional information, or proceed to contract. Rejection may be automatic at a web page if an RaaS onboarding request form does not include parameter values for required fields. Rejection may occur after analysis of the parameter values for product descriptions that appear to violate a policy of a retailer. For example, if the product description is for a product that is illegal, a product for which illegality is difficult to assess, or a product that the retailer fears may have a negative public relations consequence, the RaaS onboarding request may be rejected. Requests for additional information are generally efforts to clarify a product or to obtain information useful for improving the RaaS platform (e.g., by properly rewarding lead generators, better understanding customers, or the like).

The contract management engine 206 is intended to represent an engine that utilizes information provided by a retailer (e.g., store availability, custom fields specific to retailer, contractual terms, and the like) and information known about a potential customer which a human or artificial agent of a retailer has approved for proceeding to contract; the information is utilized to generate a contract between the potential customer and the retailer. In a specific implementation, the contract is extended by way of an e-signature provider or some other mechanism for binding relevant parties to the terms of the contract. When agreement is reached, the potential customer can be referred to as a customer and gains access to a brand dashboard (or a brand dashboard is populated with additional information if a preliminary dashboard was already provided prior to closing the contract). A retail dashboard will also typically be updated to include information about the customer and/or brand. It may be noted, particularly in the case of the retailer who likely has a preexisting retailer dashboard when a new customer is obtained, additional information is generally derived from updated datastores and is not necessarily displayed in the dashboard unless data is read from the relevant datastore.

The customer onboarding engine 208 is intended to represent an engine that prompts a customer to provide information in accordance with procedures that are, typically at least in part, retailer-specific. In a specific implementation, data can be shared via customer and retailer dashboards, and added to the data obtained from other engines, such as the lead management engine 204. Onboarding can be repeated for each brand a customer wishes to offer through the retailer, but this is conceptually treated as part of a brand integration system in this paper. See, e.g., FIGS. 1 and 3. The products themselves are handled in accordance with an inventory accounting system. See, e.g., FIGS. 1 and 4.

The RaaS platform interface engine 210 is intended to represent other engines of an RaaS platform that are described elsewhere in this paper.

Figure 3:
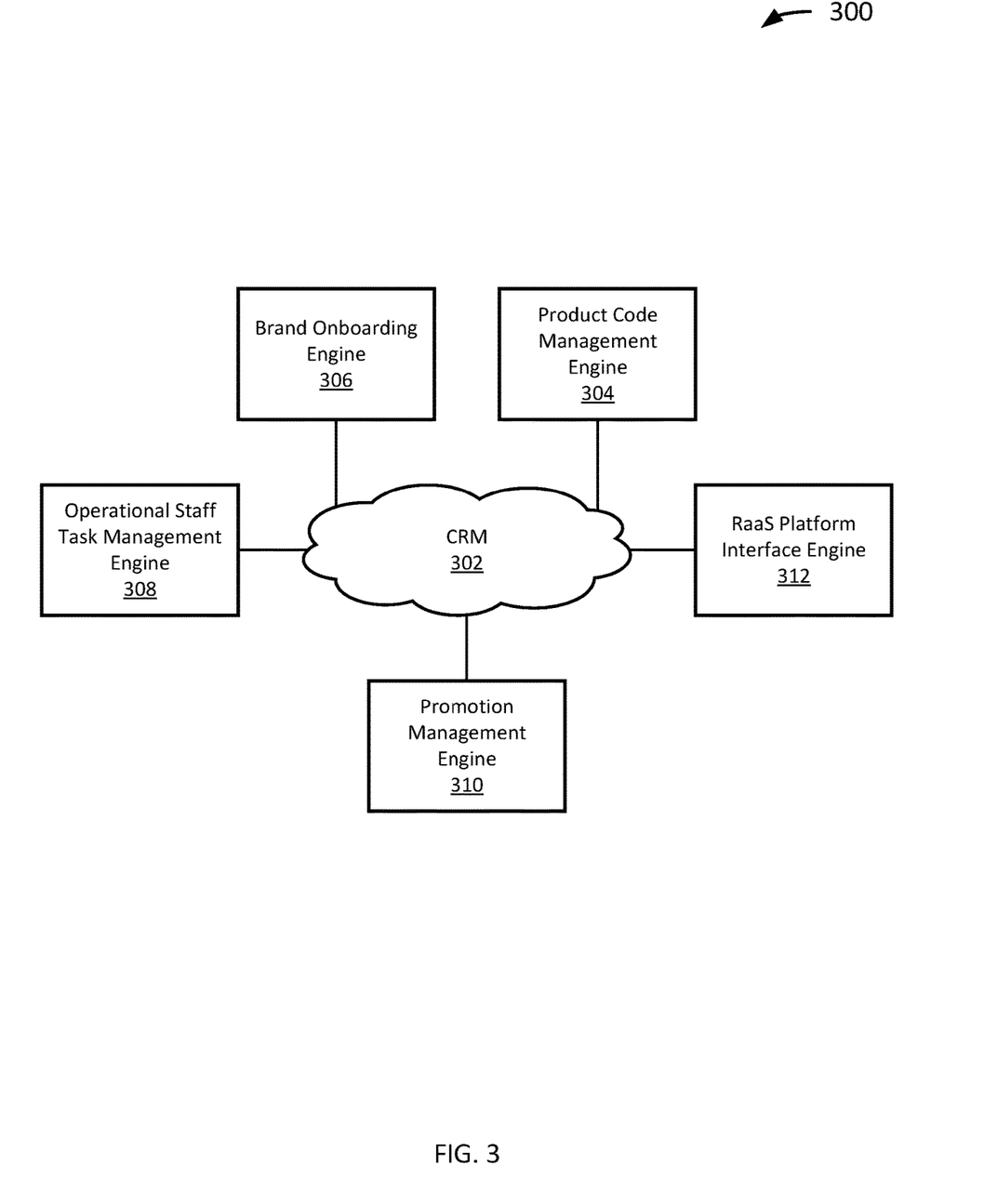
FIG. 3 depicts a diagram of an example of a brand integration system.

FIG. 3 depicts a diagram 300 of an example of a brand integration system. The diagram 300 includes a CRM 302, a product code management engine 304 coupled to the CRM 302, a brand onboarding engine 306 coupled to the CRM 302, an operational staff task management engine 308 coupled to the CRM 302, a promotion management engine 310 coupled to the CRM 302, and an RaaS platform integration engine 312 coupled to the CRM 302.

The product code management engine 304 is intended to represent an engine that ensures locally unique product code associations with products. As used here, locally unique is intended to mean unique relative to a retailer. It is possible to implement a system, utilizing techniques described in this paper, that has product codes that are unique relative to one store of a retailer with many stores, but in this paper product codes are assumed to be unique across all stores for illustrative convenience. In a specific implementation, the product code management engine obtains GS1 certified UPCs from a customer datastore and associates each GS1 certified UPC with an applicable product. For a product code designated for internal use (or for some other arbitrary product code), the product code management engine 304 compares the product code with an active product code datastore to determine whether the product code has been associated with a product currently available through the retailer. If the product code is available for use, product code management engine 304 associates the product code with an applicable product. If the product code is already in use, the product code management engine 304 notifies relevant parties regarding the overloaded product code. There are a variety of ways to deal with an overloaded product code.

For example, a customer could be prompted to provide a new product code, a retailer could generate a new product code and inform the customer of the new product code, a retailer could generate a new product code and cover the product code on the product or a tag with a sticker that displays the new product code, a retailer could provide store staff with a duplicate bar code procedure (e.g., the store staff could have a sheet at the register indicating how to treat the duplicate bar code), to name several.

The brand onboarding engine 306 is intended to represent an engine that facilitates submission of data by a customer for integration into an RaaS platform. For example, a customer could submit a product description and a product code from the product code management engine 304, which the retailer can integrate into Point-of-Sale (PoS) systems, inventory systems, e-commerce systems, etc. Other brand onboarding data can include catalogs or catalog entries, signage requirements, or the like. In a specific implementation, the brand onboarding engine 306 supports an executable component (an application, a process, an executable portion of a web browser, etc.) that receives instructions from retailers to identify available facilities and parameters associated therewith (e.g., location, timeline, rental cost, rental space, etc.), which a customer can use for making brand onboarding decisions. Advantageously, using analytics described in this paper, predictions can be made about how a product would perform at a given facility, so customers can be informed what facilities (or retailers if multiple retailers are available) would provide an optimal sales environment for products.

The operational staff task management engine 308 is intended to represent an engine that provides a process for operational staff to manage a brand. Typical procedures include approving a catalog entry for a brand, approving signage, providing data to a retailer regarding information obtained from routine analysis, to name a few.

The promotion management engine 310 is intended to represent an engine that automates a product promotion process. In a specific implementation, a customer can submit a promotional request (e.g., 10% discount for Mother's Day) and a retailer can approve or reject the request in accordance with preset promotion approval threshold parameters. This technique can be utilized to support bundled promotions or to trigger promotions at certain times. Advantageously, using analytics described in this paper, predictions can be made about how a promotion would perform, so customers can be informed what promotions should be offered and in which facility.

The RaaS platform interface engine 312 is intended to represent other engines of an RaaS platform that are described elsewhere in this paper.

Figure 4:
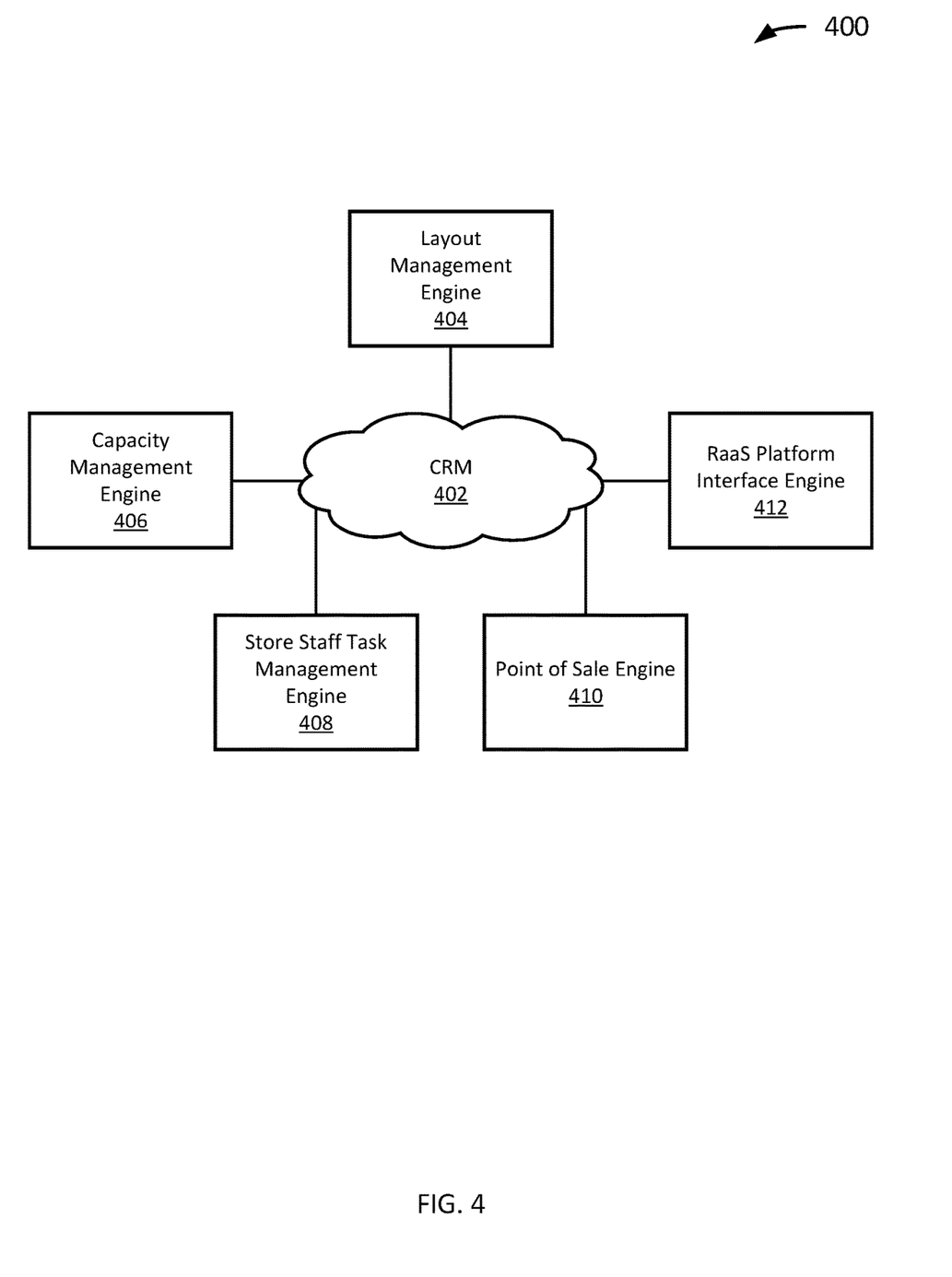
FIG. 4 depicts a diagram of an example of a facility management system.

FIG. 4 depicts a diagram 400 of an example of a facility management system. The diagram 400 includes a CRM 402, a facility layout engine 404 coupled to the CRM 402, a capacity management engine 406 coupled to the CRM 402, a store staff task engine 408 coupled to the CRM 402, a PoS engine 410 coupled to the CRM 402, and an RaaS platform interface engine 412 coupled to the CRM 402. The CRM 402 can be implemented as described previously.

The facility layout engine 404 is intended to represent an engine that facilitates configuration of space within a facility. The layout of a facility can have an impact on floorspace or capacity (in three dimensions to the extent a first display can be located above a second display). In a specific implementation, the facility layout engine 404 is configured to manage attributes of one or more facilities. The facility layout engine 404 may or may not make use of Computer Aided Design (CAD) files that represent features and fixtures of a facility. In some implementations, the facility layout engine 404 processes instructions from retailers to modify the layout of facilities and/or items within facilities. The facility layout engine 404 may, for instance, process instructions from a human or artificial agent of a facility to modify facility layouts by assigning locations to products (including, potentially, numbers of products on display) or instructing applicable agents to add, change, or remove walls, fixtures, or unattached furniture within the facility. The facility layout engine 404 may store facility layout parameters in a facility layout datastore and use one or more of the various sensors of the facility to update the datastore with detected layout parameters (including, potentially, a notification to relevant parties when the detected layout parameters deviate from intended layout parameters).

The capacity management engine 406 is intended to represent an engine that facilitates selling and leveraging space within the facility. From a retailer's perspective, capacity can be treated as saleable inventory, so it is desirable to maximize floorspace utility.

The store staff task engine 408 is intended to represent an engine for orchestrating in-store work schedules and action items. Store staff tasks can include putting up sale signs, product training (e.g., learning how to demo a product), and learning how to enter data useful for analytics, to name a few.

The PoS engine 410 is intended to represent an engine that includes various devices and software at a facility to enable a consumer to purchase a product. Depending upon implementation-specific details, the PoS engine 410 enables facility staff to receive cash, credit cards, electronic payments, digital currencies, and/or other forms of payments in exchange for products. The PoS engine 410 may provide these forms of payments to a customer, retailer, or third party for reconciliation with manufacturer, retailer, credit card, or with other systems.

The RaaS platform interface engine 412 is intended to represent other engines of an RaaS platform that are described elsewhere in this paper.

Figure 5:
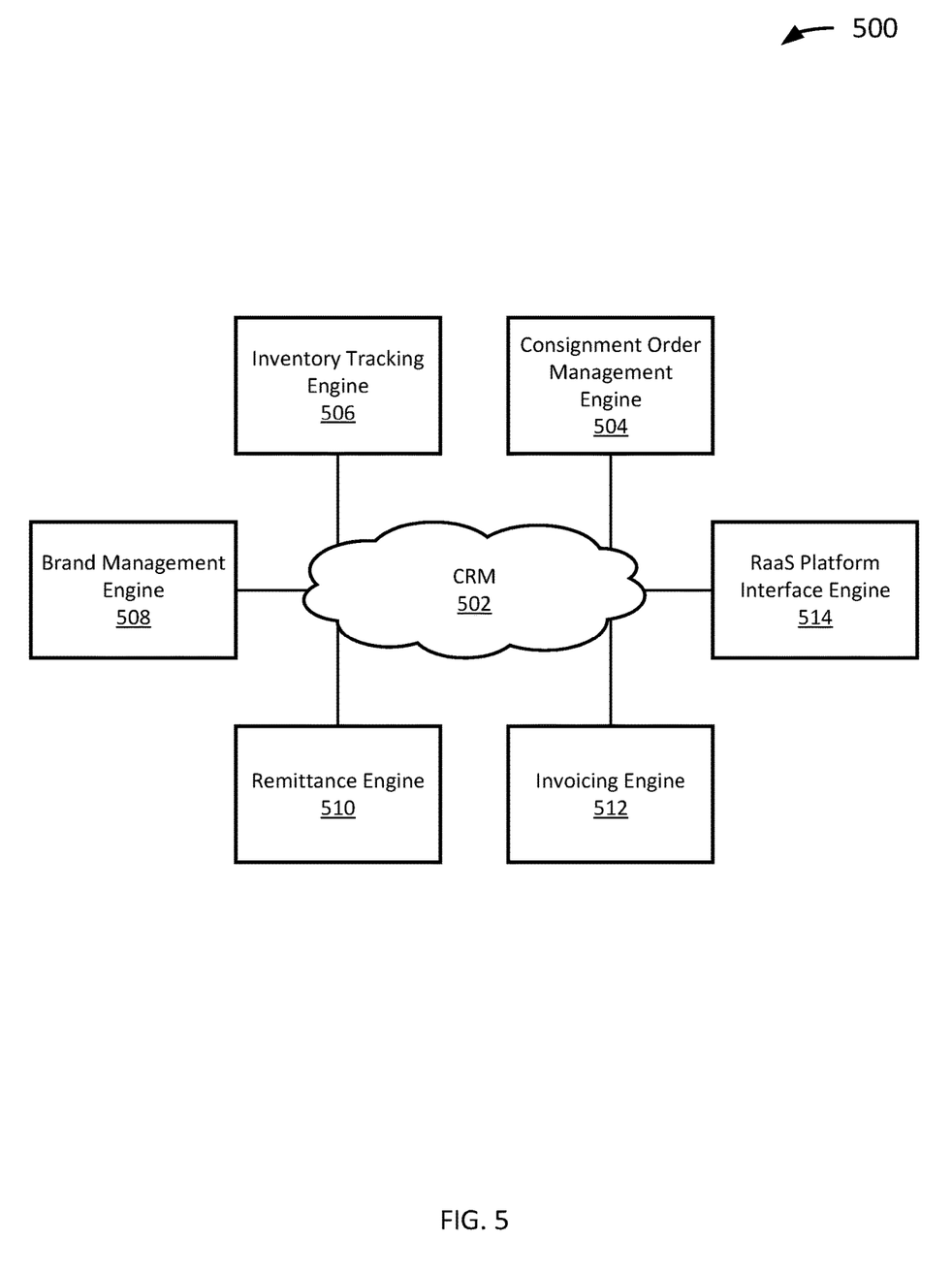
FIG. 5 depicts a diagram of an example of an inventory accounting system.

FIG. 5 depicts a diagram 500 of an example of an inventory accounting system. The diagram 500 includes a CRM 502, a consignment order management engine 504 coupled to the CRM 502, an inventory tracking engine 506 coupled to the CRM 502, a brand management engine 508 coupled to the CRM 502, a remittance engine 510 coupled to the CRM 502, an invoicing engine 512 coupled to the CRM 502, and an RaaS platform interface engine 514 coupled to the CRM 502.

The consignment order management engine 504 is intended to represent an engine that facilitates a (typically) retailer-specific consignment workflow. As used in this paper, consignment is the act of a customer giving custody of products to a retailer for the purpose of placing the products on sale in a facility, but retaining legal ownership until the products are sold; the retailer sells the products on behalf of the customer according to terms of a contract. Although not limited to capital-constrained customers, consignment is particularly advantageous for customers with limited ability to enter into traditional retail agreements because such agreements require substantial cost outlays by a retailer (and have corresponding relatively onerous requirements on the producers of the products). Advantageously, using analytics described in this paper, predicted sales can be exceptionally accurate, so consignment orders can be generated automatically based upon predicted sales.

The inventory tracking engine 506 is intended to represent an engine that facilitates an understanding of inventory data in any facility. Inventory tracking is normally initiated when a customer provides tracking data for products being provided for consignment and ends when the product is sold. In a specific implementation, the inventory tracking engine 506 uses RaaS system datastores, which include tracking data from a customer and a facility, to track inventory from the time it is accepted on consignment to the time it is sold. In an alternative, the inventory tracking engine 506 begins tracking of inventory from the time it is shipped (or even manufactured), and can continue tracking inventory as long as the product can be followed post-purchase (though a post-sale product is typically no longer referred to as "inventory").

The brand management engine 508 is intended to represent an engine that provides access to historical and analytical data about products associated with a brand. Historical data can include how long a product was offered for sale, traffic flow around the product, and the estimated impact of promotional efforts, to name a few.

The remittance engine 510 is intended to represent an engine that establishes a remittance procedure for when products are sold at retail. In a specific implementation, a retailer remits proceeds from a sale of a product. Terms of a contractual agreement my dictate whether the remittance is all of the proceeds or a fraction thereof. If a customer pays an adequate fee for space (e.g., monthly), it may be feasible for the retailer to remit the entire amount of the proceeds from a sale.

The invoicing engine 512 is intended to represent an engine that establishes an invoicing procedure for a customer to pay a retailer for space. In a specific implementation, a retailer charges a monthly fee for space in which a product is offered at retail. There may be additional charges for storage, special handling instructions, or the like.

The RaaS platform interface engine 514 is intended to represent other engines of an RaaS platform that are described elsewhere in this paper.

Figure 6:
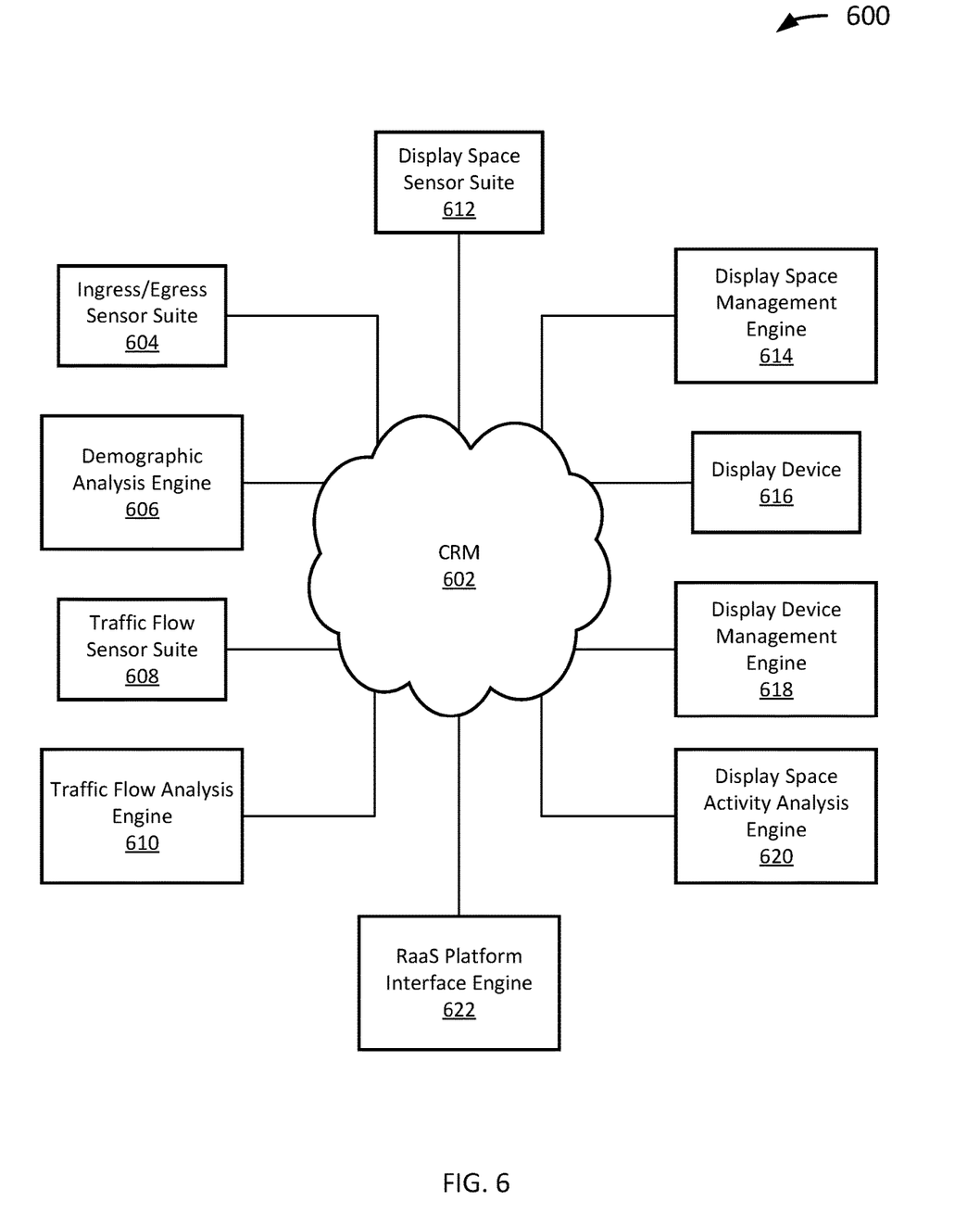
FIG. 6 depicts a diagram of an example of a facility input/output (I/O) device system.

FIG. 6 depicts a diagram 600 of an example of a facility I/O device system. The diagram 600 includes a CRM 602, an ingress/egress sensor suite 604 coupled to the CRM 602, a demographic analysis engine 606 coupled to the CRM 602, a traffic flow sensor suite 608 coupled to the CRM 602, a traffic flow analysis engine 610 coupled to the CRM 602, a display space sensor suite 612 coupled to the CRM 602, a display space analysis engine 614 coupled to the CRM 602, a display device 616 coupled to the CRM 602, a display device management engine 618 coupled to the CRM 602, a display space activity analysis engine 620 coupled to the CRM 602, and an RaaS platform interface engine 622 coupled to the CRM 602.

The ingress/egress sensor suite 604 is intended to represent one or more sensors positioned at the entrance of a facility for detecting potential consumers entering and leaving the facility. The ingress/egress sensor suite 604, and other sensor suites described in this paper, if applicable, may include cameras, microphones, wireless signal transmitters and/or receivers, pressure-sensitive pads, or other sensors configured to detect activity (images, video, sounds, signals, etc.) in the relevant area of a facility. In a specific implementation, the ingress/egress sensor suite 604 includes a camera. The ingress/egress sensor suite 604 may or may not include sensors that serve a security function by, for example, detecting a Radio Frequency Identification (RFID) signature from an active or passive RFID product tag that is supposed to be removed upon purchase. The ingress/egress sensor suite 604 may or may not include sensors that detect electronic signals from devices carried by potential consumers, such as wireless signals from personal electronic devices, such as smartphones.

The demographic analysis engine 606 is intended to represent an engine that uses signals from the ingress/egress sensor suite 604 (and other sensors described in this paper) to generate demographic data and visualizations about consumers. Due to legal constraints on capturing Personally Identifiable Information (PII), some captured data may be scrubbed (e.g., faces blurred, spoken phrases ignored other than, potentially, hot words, or the like). Demographic data can include count, dwell (particularly derived in concert with other in-store sensors), and occupancy for males and females, consumers of various ages, or consumers of various builds (e.g., by weight or height) assuming sex, age, and/or build are determinable by the system. Because facility location is known, geographic data can also be considered and potentially augmented with visual cues or hot words that can be analyzed for regional dialects of non-local consumers. Other demographic data can also be captured, but becomes more problematic in some instances (e.g., race can be considered a social construct that defies detectable phenological categorization), but can be useful in machine learning, which can uncover patterns that are meaningful in the context of retail absent preconceived notions of demographic differentiation, such as clothing style, color, or brand, hairstyle, makeup, posture, etc. Visualizations can include graphs, capture rate maps (e.g., consumers who are detected at the ingress and enter a facility compared to those who do not), pathmaps, and heat maps.

The traffic flow sensor suite 608 is intended to represent one or more sensors positioned to detect stimuli within a facility. The traffic flow sensor suite 608 can be used to detect consumers much like the ingress/egress sensor suite 604, but can also include monitoring of inventory (e.g., whether a product is picked up and either replaced or purchased by monitoring an RFID tag or detecting a signal from a pressure-sensitive pad), location-specific infrared beacons, and/or facility-owned devices, such as shopping carts, clothes hangers, or the like. Advantageously, facility-owned devices remain (or are intended to remain) within a facility, so they can be continuously tracked, which facilitates a better understanding of what products are taken to a dressing room, where a product is taken (to establish better associations between interest in products by a given consumer), whether the product is purchased at Point of Sale (PoS), and correlations of products purchased together. Traffic flow can also be tracked in and around facility staff if the staff have a detectable signal (e.g., via a smartphone or RFID tag) or are detected and tracked in the same manner as consumers (though potentially with fewer constraints associated with PII).

The traffic flow analysis engine 610 is intended to represent an engine that uses signals from the traffic flow sensor suite 608 to track inventory and consumer traffic within a facility. The same types of data as is available from the demographic analysis engine 606 can be obtained, with typically richer data from facility-owned devices, staff input, and inventory movement. With consumer consent, even richer data is available including, potentially, PII. With consumer consent, it becomes possible to tie behavioristic and psychographic data of a consumer to detected demographic data, in addition to any richer demographic and geographic data that can be obtained from a consumer profile. Even without consumer consent, it is possible to determine consumer behavioristics by linger at various products and what products are purchased together (or not purchased after apparent consideration).

The display space sensor suite 612 is intended to represent one or more dedicated sensors positioned to detect stimuli at and around a product space. In a specific implementation, the display space sensor suite 612 includes a product camera that is directed at a product and detects activity associated therewith. In a specific implementation, while PII may need to be scrubbed for all applicable parties, a customer has access to data collected by the display space sensor suite 612, as well as relevant analytics. Advantageously, a retailer can assign a camera to a product in an exclusive manner such that if a consumer is in the Field of View (FoV) of the camera, an alert with camera ID can be generated in association with the product ID.

The display space management engine 614 is intended to represent an engine that accepts instructions from a customer or retailer to modify a display space or otherwise configure the display space sensor suite 612. In a specific implementation, the display space management engine 614 generates a notification for agents of the facility to change a display space to match intended display parameters. Instead or in addition, the display space sensor suite 612 can provide signals sufficient for the display space management engine 614 to determine whether display parameters match intended display parameters (e.g., whether a product is properly positioned, a sale sign is visible, or whether the wrong product is displayed, to name a few) and, in the event display parameters do not match intended display parameters, whether due to new instructions, human error, or unforeseen circumstances, to generate a notification for a human or artificial agent of the facility to match the actual display parameters to the intended display parameters.

The display device 618 is intended to represent a device to display product information, such as sale price, catalog entry, or promotions, to name a few, to consumers at a facility. The display device 618 can be implemented as a smartphone, tablet computing device, or a monitor, to name a few. The display device 618 can include sensors, such as a camera, gyroscope, or accelerometer, to name a few. Advantageously, the display device 618 is exclusively associated with a product, which logically links the display device 618, the product, and the facility, and receives updates associated with any of these in real time while the rest of the RaaS platform is also updated.

In a specific implementation, the display device 618 runs software real-time integrated into the RaaS platform using a custom version of Android™. Thus, within retailer-specific parameters, a customer can modify the configuration of the display device 618 in real time. Advantageously, updates to pricing and other parameters can be provided in real time and passed on to, e.g., the PoS. The display device 618 may also display facility-specific data, such as wait times to checkout counters, product inventory, or shipping options, to name a few, which can also be updated in real time.

Sensors of the display device 618 may provide data that on its own, or in combination with other sensor suites, can readily detect interaction between a consumer and a product. In a specific implementation, sensors of the display device 618 provide signals that facilitate gaze tracking, pose recognition, and sentiment analysis. Gaze tracking can follow a consumer's gaze between the display device 618 itself or the product with which the display device 618 is associated. In an alternative, pose recognition is done using sensor data from the display space sensor suite 614 alone. Sentiment analysis may have difficulty correlating ambient sentiment and sentiment associated with the product, but may be useful when aggregated with other data.

The display device management engine 620 is intended to represent an engine that communicates with the display device 618. The display device management engine 620 may be implemented on the display device 618, in whole or in part. In a specific implementation, the display device management engine 620 configures the display device 618 in accordance with instructions from a consumer, retailer, facility staff, or other applicable entity.

The display space activity analysis engine 622 is intended to represent an engine that receives signals (raw or preprocessed) from the display space sensor suite 614 and sensors of the display device 618, if applicable, and analyzes the signals to provide data associated with consumer activity near an associated product. As mentioned previously, analytics can provide data and visuals associated with consumers, but because the sensors are dedicated to the product, a richer data set is available for the product. Anonymization may be important for legal reasons, but within the vicinity of a product, identification of hot words can be more relevant and can assist with sentiment analysis. In a specific implementation, brand and product type are designated hot words within FoV of a product; the hot words are used in conjunction with sentiment analysis to determine consumer sentiment toward the product.

In a specific implementation, the display space activity analysis engine 622 performs anonymous clienteling in conjunction with facility-owned devices (including, if applicable, product RFID tags) to track an anonymized consumer who has interacted with a product (or at least entered a display space). The anonymously clienteled consumer may return to a product later, which can be tracked, even if PII (e.g., an image of the consumer) is scrubbed, or interact with similar products within the facility. Anonymous clienteling is useful for tracking consumer activity while the consumer is in the facility, but even after the consumer leaves the facility, the anonymous clienteling data is still potentially useful for profiling other anonymously clienteled consumers.

In a specific implementation, anonymous clienteling is converted to attribution clienteling when a consumer opts in for a mailing list, scans a QR code to obtain a coupon, or can be identified as taking a paper coupon (if possible, with an identifying serial number). Attribution clienteling enables a retailer to be properly attributed for piquing the interest of a consumer who takes advantage of an in-store coupon or the equivalent. Advantageously, attribution clienteling can be accomplished without revealing PII of the consumer because it relies upon a coupon serial number.

In a specific implementation, anonymous clienteling is converted to limited clienteling by assigning an advertising ID to a consumer. As used in this paper, an advertising ID is associated with a consumer profile, but the consumer can reset the advertising ID to clear some or all PII from association with the advertising ID. Alternatively or in addition, the consumer can have more than one advertising ID, each of which is associated with a different aspect of the consumer (e.g., a per-retailer advertising ID, a work-related advertising ID, or a grocery advertising ID, to name a few).

Of course, any of the above-described types of clienteling can be replaced with transparent clienteling with consumer consent. The advantages of clienteling are well-known, but in conjunction with techniques described in this paper, it can become even more valuable to customers and retailers.

The RaaS platform interface engine 622 is intended to represent other engines of an RaaS platform that are described elsewhere in this paper.

Figure 7:
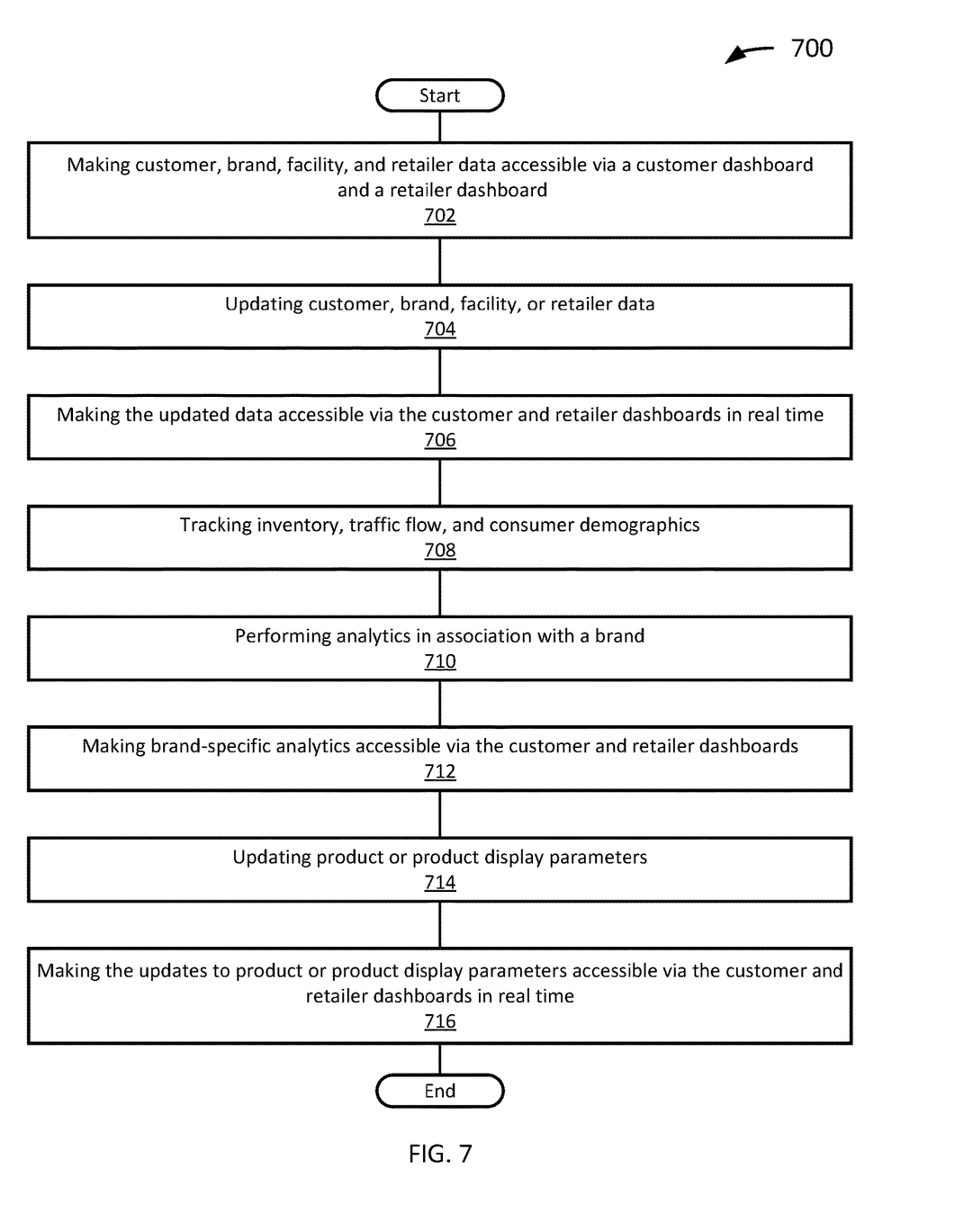
FIG. 7 depicts a flowchart of an example of a method for intelligent updating of RaaS parameters in real time.

FIG. 7 depicts a flowchart 700 of an example of a method for intelligent updating of RaaS parameters in real time. The flowchart 700 starts at module 702 with making customer, brand, facility, and retailer data accessible via a customer dashboard that is accessible by the customer and a retailer dashboard that is accessible by the retailer. An example of a customer integration system capable of onboarding a customer is illustrated in FIG. 2 (see also customer integration system 104, FIG. 1). An example of a brand integration system capable of onboarding a brand is illustrated in FIG. 3 (see also brand integration system 106, FIG. 1). An example of a facility management system capable of managing operations of a facility is illustrated in FIG. 4 (see also facility management system 108, FIG. 1). Retailer data is provided as part of a customer onboarding process and as part of providing data about retail facilities. A customer can use the retailer and facility data to make informed decisions regarding where to offer products.

The flowchart 700 continues to module 704 with updating customer, brand, facility, or retailer data. Customers can update parameters associated with themselves and their brand, presumably so long as they do not deviate from terms of a customer-retailer contract. Retailers can update parameters associated with themselves and their facilities, again, presumably so long as they do not deviate from terms of a customer-retailer contract.

The flowchart 700 continues to module 706 with making the updated data accessible via the customer dashboard and the retailer dashboard in real time. Advantageously, the RaaS platform described in this paper causes data to become immediately available to all relevant parties. This can include prospective changes, such as intended changes to a facility. In addition to changes becoming available in the customer and retailer dashboards, notifications can be used to ensure awareness of the changes. In an embodiment, the notifications are provided to mobile devices of the customer, retailer, and facility staff, e.g., as an SMS message.

The flowchart 700 continues to module 708 with tracking inventory, traffic flow and consumer demographics. An example of an inventory accounting system capable of managing inventory from consignment to sale (including invoicing and remittance) is illustrated in FIG. 5 (see also inventory accounting system 110, FIG. 1). An example of a facility I/O device system capable of monitoring movement of inventory and consumers and generating demographic data is illustrated in FIG. 6 (see also facility I/O device system 112, FIG. 1).

The flowchart 700 continues to module 710 with performing analytics in association with a brand. It should be understood analytics can be performed in association with a facility or a retailer, but for the purpose of the example of FIG. 7, the customer is treated as the focus. Accordingly, the analytics associated with a brand of the customer is explicitly mentioned. Such analytics can include similar brands that are not actually the brand of the customer because similar brands can be associated with the brand of the customer.

The flowchart 700 continues to module 712 with making brand-specific analytics accessible via the customer and retailer dashboards. The integration can be accomplished via an RaaS analytics integration engine (see, e.g., the RaaS analytics engine 114, FIG. 1), but the integration can happen as a matter of course in some instances because display space sensors are explicitly associated with a brand. That means images and data associated with a display space sensor can be stamped with a sensor ID for which a customer is preauthorized. In a specific implementation, a customer can even have a live feed from a sensor (though presumably with faces blurred, assuming the sensor is a camera, to protect PII).

The flowchart 700 continues to module 714 with updating product or product display parameters. A customer can update a product parameter, such as a product price, or a product display parameter, such as with a new advertisement, in any applicable way that does not violate a customer-retailer contractual agreement. Facility staff can also update product displays to include facility-specific parameters, such as wait time at a PoS.

The flowchart 700 ends at module 716 with making product or product display parameters accessible to a retailer dashboard in real time. When a customer updates product or product display parameters, the RaaS platform immediately updates all relevant parties to the change. For example, a change in product pricing automatically updates product pricing at the PoS and the product display. As another example, a change in an advertisement at a product display can trigger a notification to facility staff to be aware of the change. The retailer dashboard is explicitly referenced because the changes are typically made by a customer, but where changes are made by facility staff or the retailer in general, a customer dashboard may be updated in real time, as well. The flowchart 700 ends at module 716 as the illustrative point has been made, though the flowchart can, of course, repeat or proceed to some other workflow.

The invention claimed is:

1. A method of providing retail as a service (RaaS) system comprising:
    a plurality of cameras, each camera of the plurality of cameras positioned at a respective camera location at a facility, for acquiring images of a consumer at the facility to track movements and interactions of the consumer through the facility;
    a plurality of beacons, each beacon of the plurality of beacons positioned at a respective beacon location at the facility, for tracking movements of the consumer through the facility;
    a plurality of ingress and egress sensors, each of the plurality of ingress and egress sensors positioned at an entrance of the facility for detecting the consumer entering and exiting the facility;
    one or more processors; and
    memory storing instructions that, when executed by the one or more processors, cause the system to perform:
        making customer data, brand data, facility data, and retailer data accessible via a customer dashboard accessible by a customer and via a retailer dashboard accessible by a retailer;
        receiving, from the customer via the customer dashboard, updates to one or more of the customer data and the brand data;
        making the updates to the one or more of the customer data and the brand data accessible via the retailer dashboard in real time;
        receiving, from the retailer via the retailer dashboard, updates to one or more of the retailer data and the facility data;
        making the updates to the one or more of the retailer data and the facility data accessible via the customer dashboard in real time based on the plurality of cameras and the plurality of beacons and the plurality of ingress and egress sensors;
        tracking, based on the plurality of cameras and the plurality of beacons and the plurality of ingress and egress sensors, inventory, traffic flow, and consumer demographics;
        performing analytics in association with the brand based on the tracking of inventory, traffic flow, and consumer demographics;
        making brand-specific analytics accessible via the customer dashboard and via the retailer dashboard;
        receiving, from the customer via the customer dashboard, in response to the brand-specific analytics, updates to one or more of a product parameter and a product display parameter;
        making the update to the one or more of the product parameter and the product display parameter accessible via the retailer dashboard in real time.

2. The system of claim 1, wherein the retailer data is provided as part of onboarding the customer to an RaaS platform.

3. The system of claim 1, further comprising sending a notification to one or more of the customer, the retailer, and retailer staff when an update is made via one or more of the customer dashboard and the retailer dashboard.

4. The system of claim 3, wherein the notification is sent to a mobile device of the one or more of the customer, the retailer, and retailer staff.

5. The system of claim 1, wherein the brand-specific analytics include similar brands.

6. The system of claim 1, wherein the update to a product parameter made by the customer via the customer dashboard comprises an update to a product price, the method further comprising updating the product price at a point of sale (POS) in real time.

7. The system of claim 1, wherein the update to a product display parameter made by the customer via the customer dashboard comprises an update to an advertisement for a product, the method further comprising sending a notification of the update to facility staff in real time.

8. The system of claim 1, wherein tracking inventory is performed using one or more of radio frequency identification (RFID) tags and pressure-sensitive pads attached to products.

9. The system of claim 1, wherein tracking traffic flow is performed using one or more ingress and egress sensors.

10. The system of claim 1, wherein tracking consumer demographics is performed using the plurality of cameras.

11. A retail as a service (RaaS) system comprising:
a plurality of cameras, each camera of the plurality of cameras positioned at a respective camera location at a facility, for acquiring images of a consumer at the facility to track movements and interactions of the consumer through the facility;
a plurality of beacons, each beacon of the plurality of beacons positioned at a respective beacon location at the facility, for tracking movements of the consumer through the facility;
a plurality of ingress and egress sensors, each of the plurality of ingress and egress sensors positioned at an entrance of the facility for detecting the consumer entering and exiting the facility;
an RaaS platform interface engine configured to:
make customer data, brand data, facility data, and retailer data accessible via a customer dashboard accessible by a customer and via a retailer dashboard accessible by a retailer;
receive, from the customer via the customer dashboard, updates to one or more of the customer data and the brand data;
make the updates to the one or more of the customer data and the brand data accessible via the retailer dashboard in real time;
receive, from the retailer via the retailer dashboard, updates to one or more of the retailer data and the facility data;
make the updates to the one or more of the retailer data and the facility data accessible via the customer dashboard in real time based on the plurality of cameras and the plurality of beacons and the plurality of ingress and egress sensors;
the plurality of cameras and the plurality of beacons and the plurality of ingress and egress sensors configured to track inventory, traffic flow, and consumer demographics;
the RaaS platform interface engine further configured to:
perform analytics in association with the brand based on the tracking of inventory, traffic flow, and consumer demographics;
make brand-specific analytics accessible via the customer dashboard and via the retailer dashboard;
receive, from the customer via the customer dashboard, in response to the brand-specific analytics, updates to one or more of a product parameter and a product display parameter;
make the update to the one or more of the product parameter and the product display parameter accessible via the retailer dashboard in real time.

12. The system of claim 11, the RaaS platform interface engine further configured to send a notification to one or more of the customer, the retailer, and retailer staff when an update is made via one or more of the customer dashboard and the retailer dashboard.

13. The system of claim 12, wherein the notification is sent to a mobile device of the one or more of the customer, the retailer, and retailer staff.

14. The system of claim 11, wherein the brand-specific analytics include similar brands.

15. The system of claim 11, wherein the update to a product parameter made by the customer via the customer dashboard comprises an update to a product price, the RaaS platform interface engine further configured to update the product price at a point of sale (POS) in real time.

16. The system of claim 11, wherein the update to a product display parameter made by the customer via the customer dashboard comprises an update to an advertisement for a product, the RaaS platform interface engine further configured to send a notification of the update to facility staff in real time.

17. The system of claim 11, wherein tracking inventory is performed using one or more of radio frequency identification (RFID) tags and pressure-sensitive pads attached to products.

18. The system of claim 11, wherein tracking traffic flow is performed using one or more ingress and egress sensors.

19. The system of claim 11, wherein tracking consumer demographics is performed using the plurality of cameras.

* * * * *